(12) United States Patent
Brown et al.

(10) Patent No.: US 8,284,195 B2
(45) Date of Patent: Oct. 9, 2012

(54) COOPERATIVE UTILIZATION OF SPATIAL INDICES BETWEEN APPLICATION AND RENDERING HARDWARE

(75) Inventors: Jeffrey Douglas Brown, Rochester, MN (US); Russell Dean Hoover, Rochester, MN (US); Eric Oliver Mejdrich, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 11/854,617

(22) Filed: Sep. 13, 2007

(65) Prior Publication Data

US 2009/0073167 A1 Mar. 19, 2009

(51) Int. Cl.
*G06T 15/40* (2011.01)

(52) U.S. Cl. ........ 345/421; 345/419; 345/422; 345/424; 345/426; 345/427; 345/502; 345/506; 345/660; 381/17; 381/64

(58) Field of Classification Search .............. 345/419, 345/420, 421, 422, 424, 426, 427, 502, 506, 345/660; 381/17, 64
See application file for complete search history.

(56) References Cited

U.S. PATENT DOCUMENTS

| | | | |
|---|---|---|---|
| 7,773,087 B2* | 8/2010 | Fowler et al. | 345/426 |
| 2005/0179591 A1* | 8/2005 | Bertoni et al. | 342/453 |
| 2007/0182732 A1* | 8/2007 | Woop et al. | 345/420 |
| 2009/0244058 A1* | 10/2009 | Purcell et al. | 345/418 |
| 2009/0262132 A1* | 10/2009 | Peterson et al. | 345/619 |
| 2009/0284523 A1* | 11/2009 | Peterson et al. | 345/419 |
| 2009/0289939 A1* | 11/2009 | Peterson et al. | 345/421 |
| 2009/0322752 A1* | 12/2009 | Peterson et al. | 345/426 |

OTHER PUBLICATIONS

Carr et al. "Fast GPU Ray Tracing of Dynamic Meshes using Geometry Images", Graphics Interface 2006.*
Foley et al. "KD-Tree Acceleration Structures for a GPU Raytracer", ACM 2005.*
Mahovsky et al. "Memory-Conserving Bounding Volume Hierarchies with Coherent Ray-tracing". Published 2006.*
Wald et al. "Interactive Rendering with Coherent Ray Tracing". Published 2001.*

* cited by examiner

*Primary Examiner* — Kimbinh T Nguyen
(74) *Attorney, Agent, or Firm* — Patterson & Sheridan LLP

(57) ABSTRACT

According to embodiments of the invention, a data structure may be created which may be used by both a ray tracing unit and by a rendering engine. The data structure may have an initial or upper portion representing bounding volumes which partition a three-dimensional scene and a second or lower portion representing objects within the three-dimensional scene. The integrated acceleration data structure may be used by a rendering engine to render a two-dimensional image from a three-dimensional scene, and by a ray tracing unit to perform intersection tests.

18 Claims, 14 Drawing Sheets

(FRAME N)

(FRAME N)

(FRAME N + 1)

(FRAME N+1)

COOPERATIVE UTILIZATION OF SPATIAL INDICES BETWEEN APPLICATION AND RENDERING HARDWARE

BACKGROUND OF THE INVENTION

1. Field of the Invention

Embodiments of the invention generally relate to the field of computer processing.

2. Description of the Related Art

A technique used for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

SUMMARY OF THE INVENTION

Embodiments of the present invention generally provide methods and apparatus for performing ray tracing.

According to one embodiment of the invention a method of using an integrated acceleration data structure is provided. The method generally comprising: with a first processing element, issuing a ray into a three-dimensional scene, traversing the integrated acceleration data structure by taking branches to bounding volume nodes intersected by the ray until an object node is reached, wherein the bounding volume nodes define volumes of the three-dimensional scene; and with a second processing element, rendering objects by searching for object nodes containing attributes of the object within the integrated acceleration data structure.

According to another embodiment of the invention a computer readable medium is provided. The computer readable medium containing a program which, when executed, performs an operation, generally comprising: issuing a ray into a three-dimensional scene, traversing an integrated acceleration data structure by taking branches to bounding volume nodes intersected by the ray until an object node is reached, wherein the bounding volume nodes define volumes of the three-dimensional scene, and rendering objects by searching for object nodes containing attributes of the object within the integrated acceleration data structure.

According to another embodiment of the invention a system is provided. The system generally comprising an integrated acceleration data structure, wherein the integrated acceleration data structure comprises bounding volume nodes which define bounding volumes of a three-dimensional scene and object nodes which define objects located within the three-dimensional scene; a first processing element configured to issue a ray into the three-dimensional scene, traverse the integrated acceleration data structure by taking branches to bounding volume nodes intersected by the ray; and a second processing element configured to rendering objects by searching for object nodes containing attributes of the object within the integrated acceleration data structure.

DETAILED DESCRIPTION OF THE PREFERRED EMBODIMENTS

Figure 1:
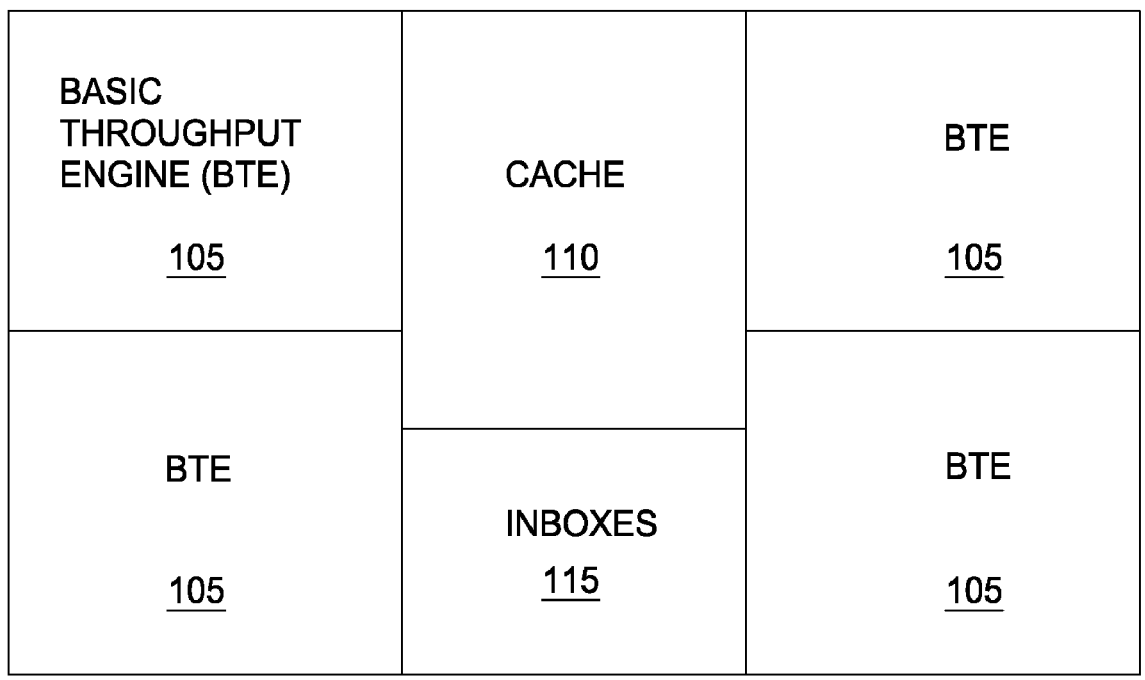
FIGS. 1 and 5 illustrate multiple core processing elements, according to embodiments of the invention.

Embodiments of the invention provide an integrated acceleration data structure which may be used by a rendering engine and a ray tracing unit. According to one embodiment of the invention, an integrated acceleration data structure may be formed by creating an initial or upper portion representing a spatially oriented hierarchy of bounding volumes which partition a three-dimensional scene, and a second or lower portion representing objects located within the three-dimensional scene. The upper portion of the integrated acceleration data structure may be connected to the lower portion of the integrated acceleration data structure by branches from nodes defining bounding volumes within the three-dimensional scene, wherein the bounding volumes encompass objects located within the three-dimensional scene. According to embodiments of the invention, by creating an integrated acceleration data structure, only one data structure may be necessary for a rendering engine to render an image within the three-dimensional scene and for a ray tracing unit to perform intersection tests.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
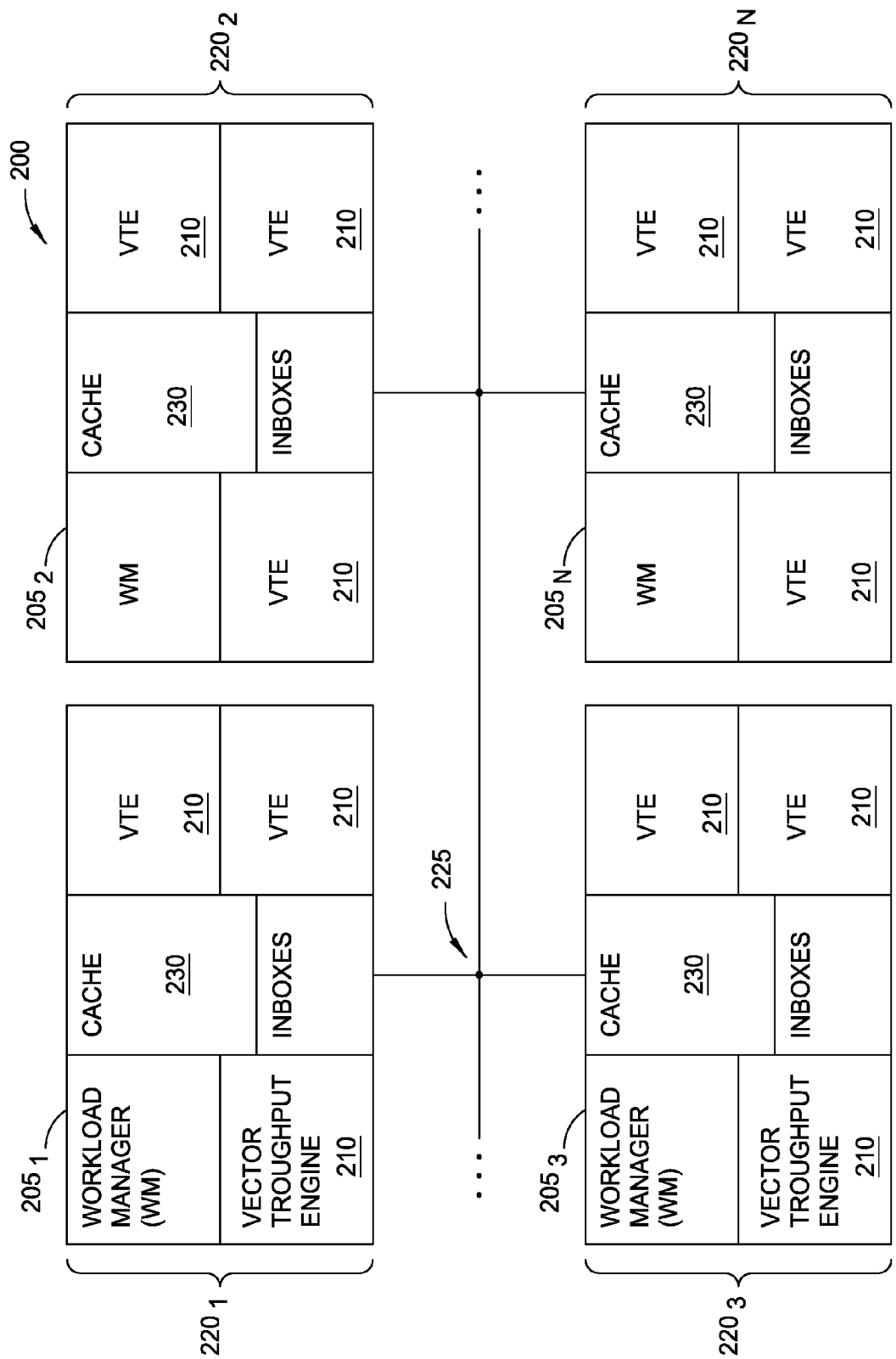
FIG. 2 illustrates multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$.

The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three-Dimensional Scene

Figure 3:
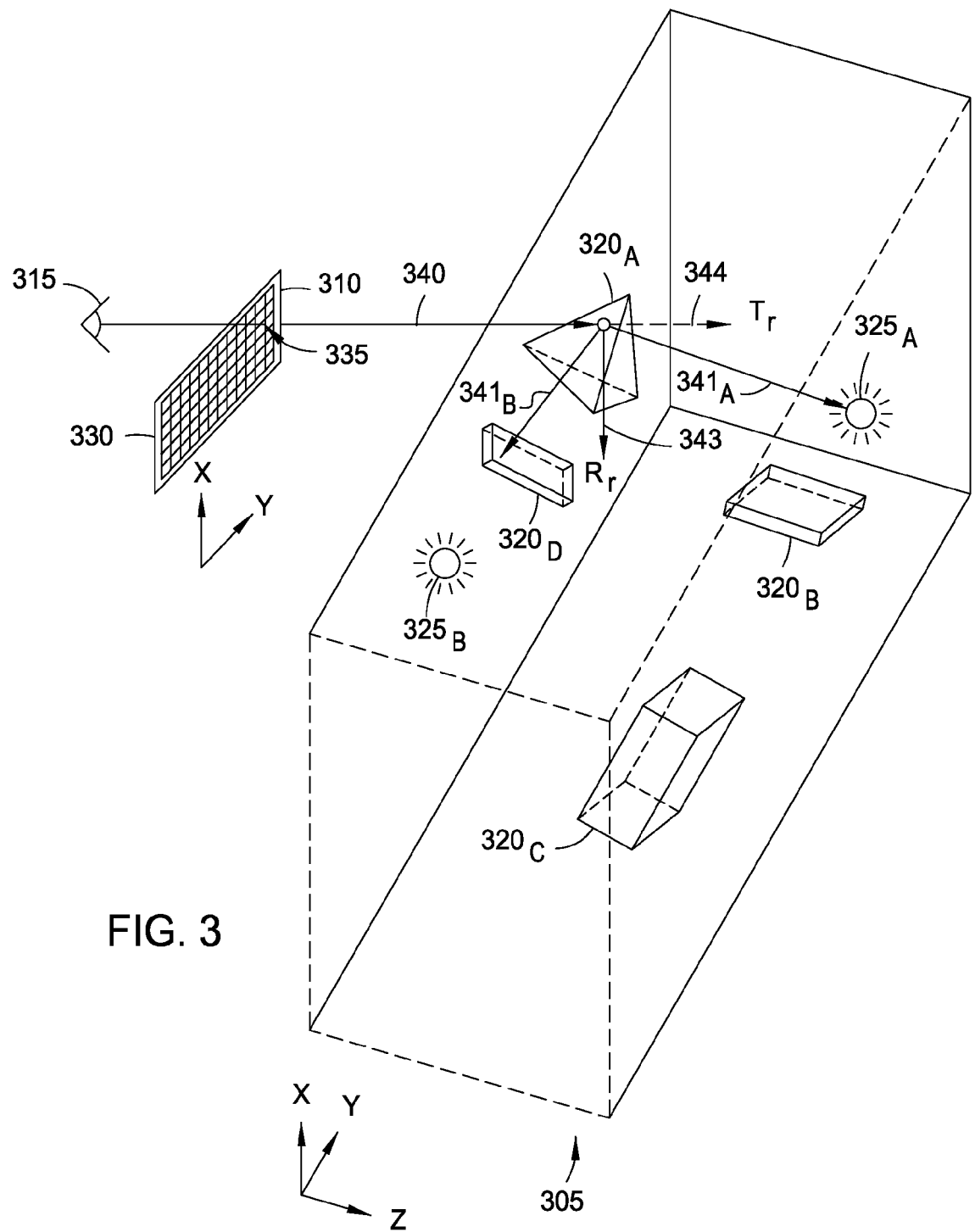
FIG. 3 is an exemplary three-dimensional scene to be rendered by an image processing system, according to one embodiment of the invention.

FIG. 3 is an exemplary three-dimensional scene 305 to be rendered by an image processing system. Within the three-dimensional scene 305 may be objects 320. The objects 320 in FIG. 3 are of different geometric shapes. Although only four objects 320 are illustrated in FIG. 3, the number of objects in a typical three-dimensional scene may be more or less. Commonly, three-dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three-dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 305 into a two-dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two-dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three-dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted or a refracted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted or refracted ray. A refracted ray may be issued by the image processing system if the object with which the original ray intersected has transparent or translucent properties (e.g., glass). A refracted ray traverses through the object at an angle relative to the angle at which the original ray struck the object. For example, refracted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
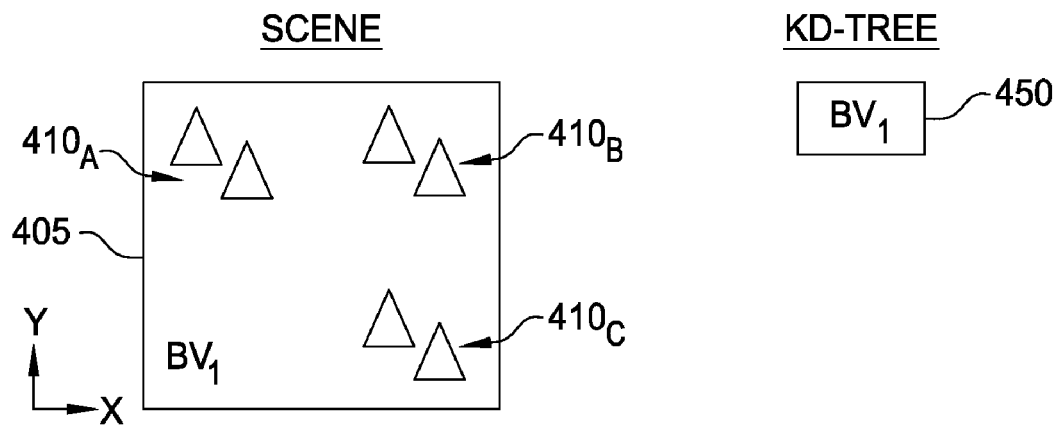
FIGS. 4A-4C illustrate a two-dimensional space to be rendered by an image processing system and a corresponding spatial index created by an image processing system, according to embodiments of the invention.
Figure 4B:
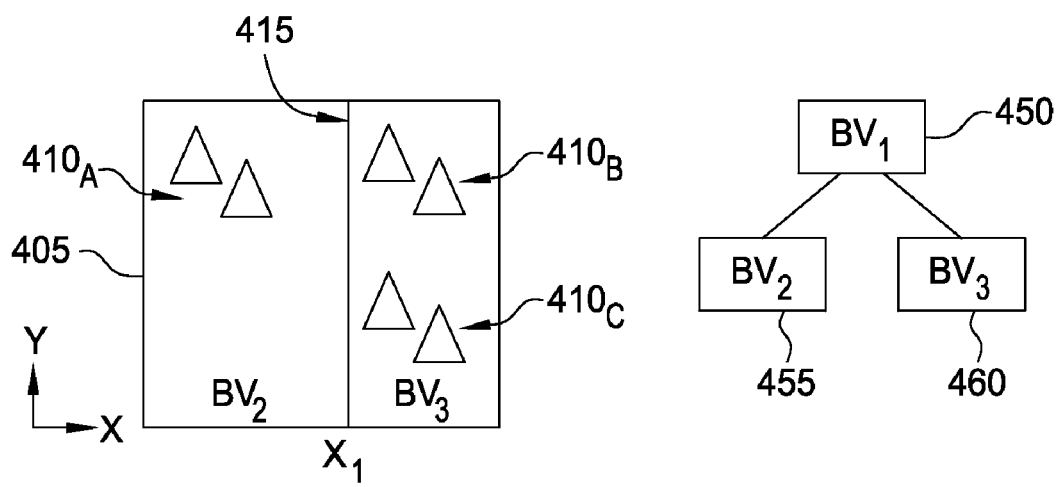
Figure 4C:
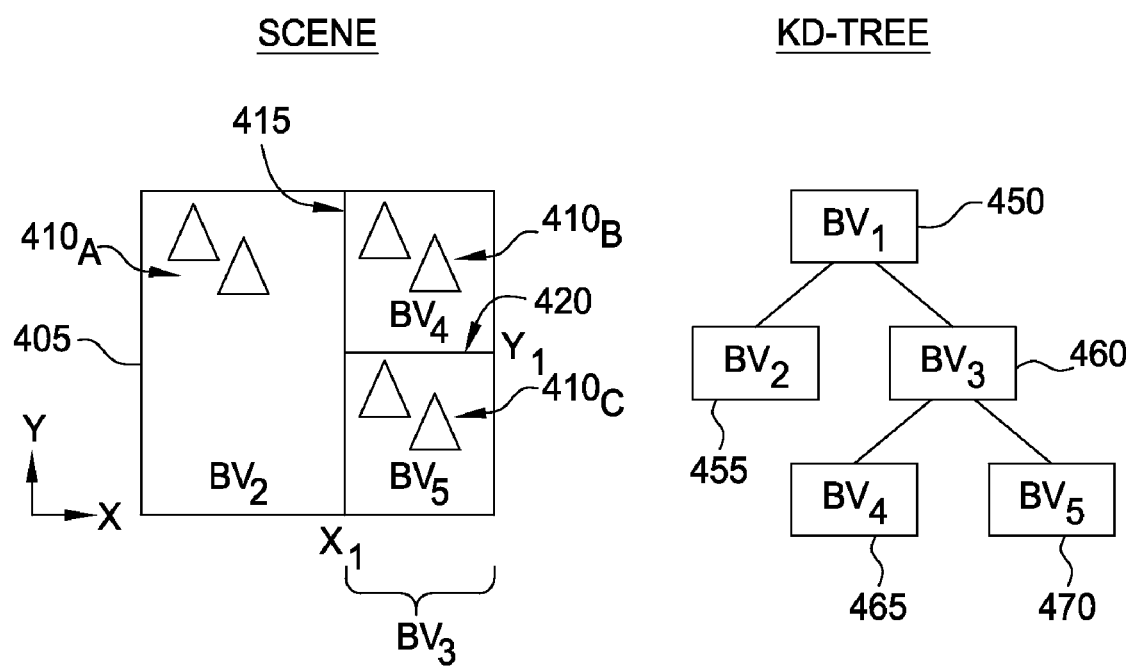

FIGS. 4A-4C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 4A-4C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 4A illustrates a two-dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two-dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two-dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Physics Engine

A physics engine is an application which may simulate real world physical phenomena as applied to objects within a three-dimensional scene. A physics engine may be used to simulate and predict the effects of physical phenomena on a frame to frame basis. For example, the physics engine may perform position updates for an object if the object is moving, and may perform collision detection tests to determine if an object collides with any other objects within the three-dimensional scene.

An image processing system may be used in conjunction with a physics engine to render the simulated physical interactions and objects within a three-dimensional scene to a two-dimensional screen. For example, a video game engine may use both a physics engine and an image processing system to simulate object movements or interactions within a three-dimensional scene and to display the objects and the environment on a monitor.

Figure 5:
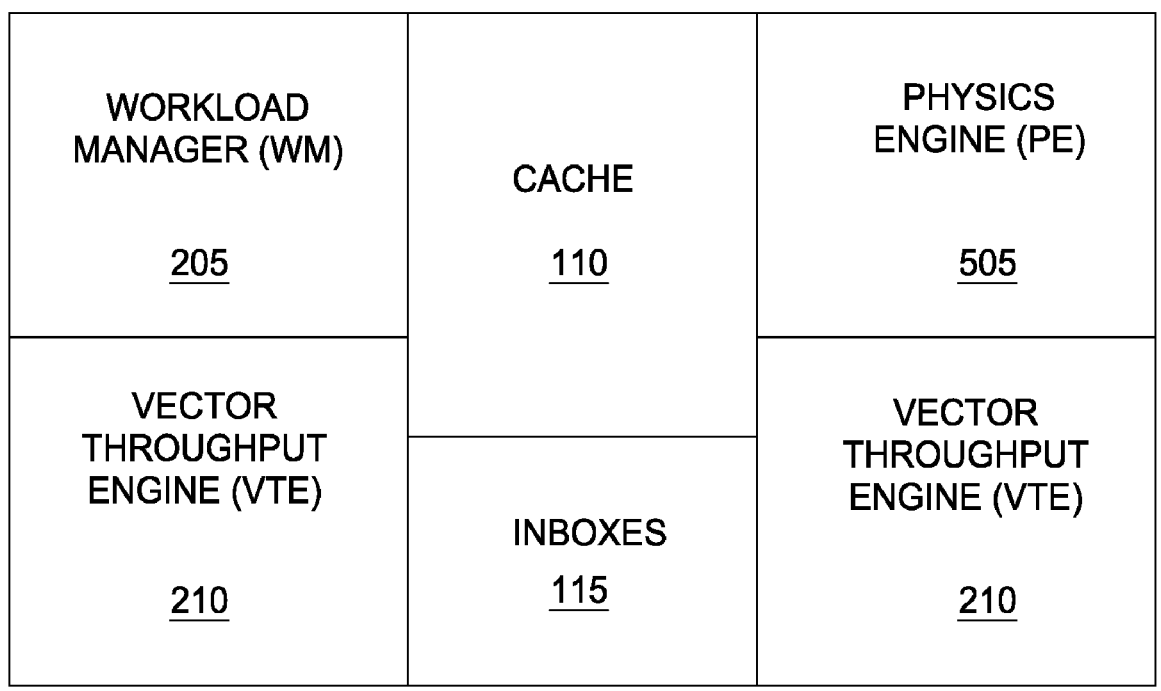

According to one embodiment of the invention, a physics engine may use multiple threads on a multiple core processing element to perform physics related calculations. For example, FIG. 5 illustrates a multiple core processing element 100 wherein the threads of one of the cores are allocated to a physics engine 505. Other cores within the multiple-core processing element may perform image processing related tasks, according to embodiments of the invention. For example, one core within the multiple-core processing element 100 may be allocated to a workload manager 205 and other cores within the multiple-core processing element 100 may be allocated to vector throughput engines 210, according to one embodiment of the invention.

The multiple-core processing element 100 may have a memory cache 110 shared between all of the cores located on the multiple-core processing element 100. Furthermore, each core may have its own cache (e.g., an L1 cache). The multiple-core processing element 100 may also contain inboxes 115. The inboxes 115 may be memory mapped address space used by the cores as a communications network.

Figure 6:
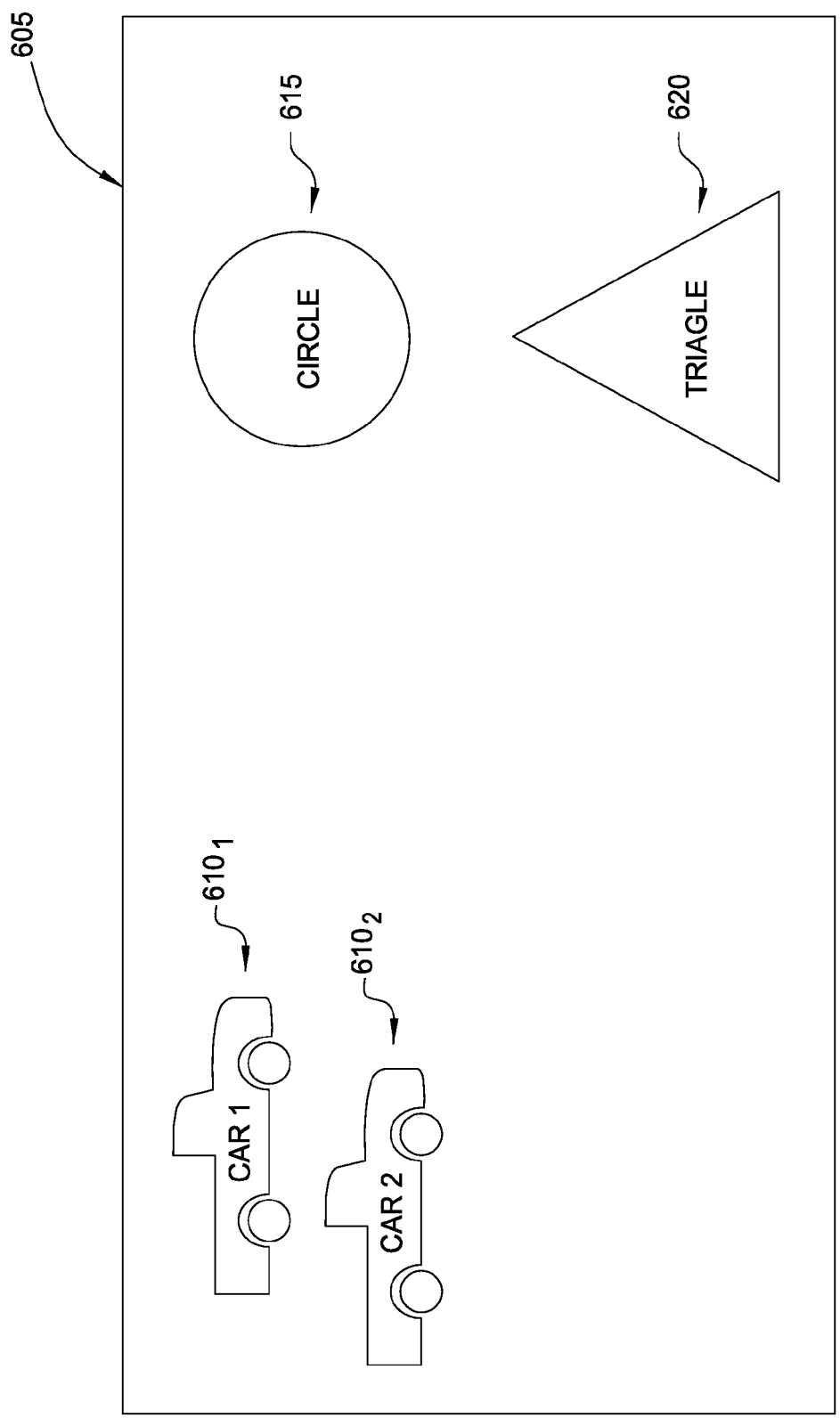
FIG. 6 illustrates an exemplary three-dimensional scene to be rendered by an image processing system, according to embodiments of the invention.

FIG. 6 illustrates an exemplary three-dimensional scene 605. The three-dimensional scene 605 contains several objects including a first car object $610_1$, a second car object $610_2$, a circle object 615, and a triangle object 620. A physics engine may simulate real world physical phenomena as applied to the objects (i.e., $610_1$, $610_2$, 615, and 620) within the three-dimensional scene 605 illustrated in FIG. 6.

One structure a physics engine may use to keep track of objects in a three-dimensional scene is a scene graph or a scene index. On a frame to frame basis, the physics engine 505 may use a scene graph to store and access information which defines the objects located within the three-dimensional scene. The scene graph may use a hierarchical structure (e.g., a tree) to index or order the objects.

Figure 7:
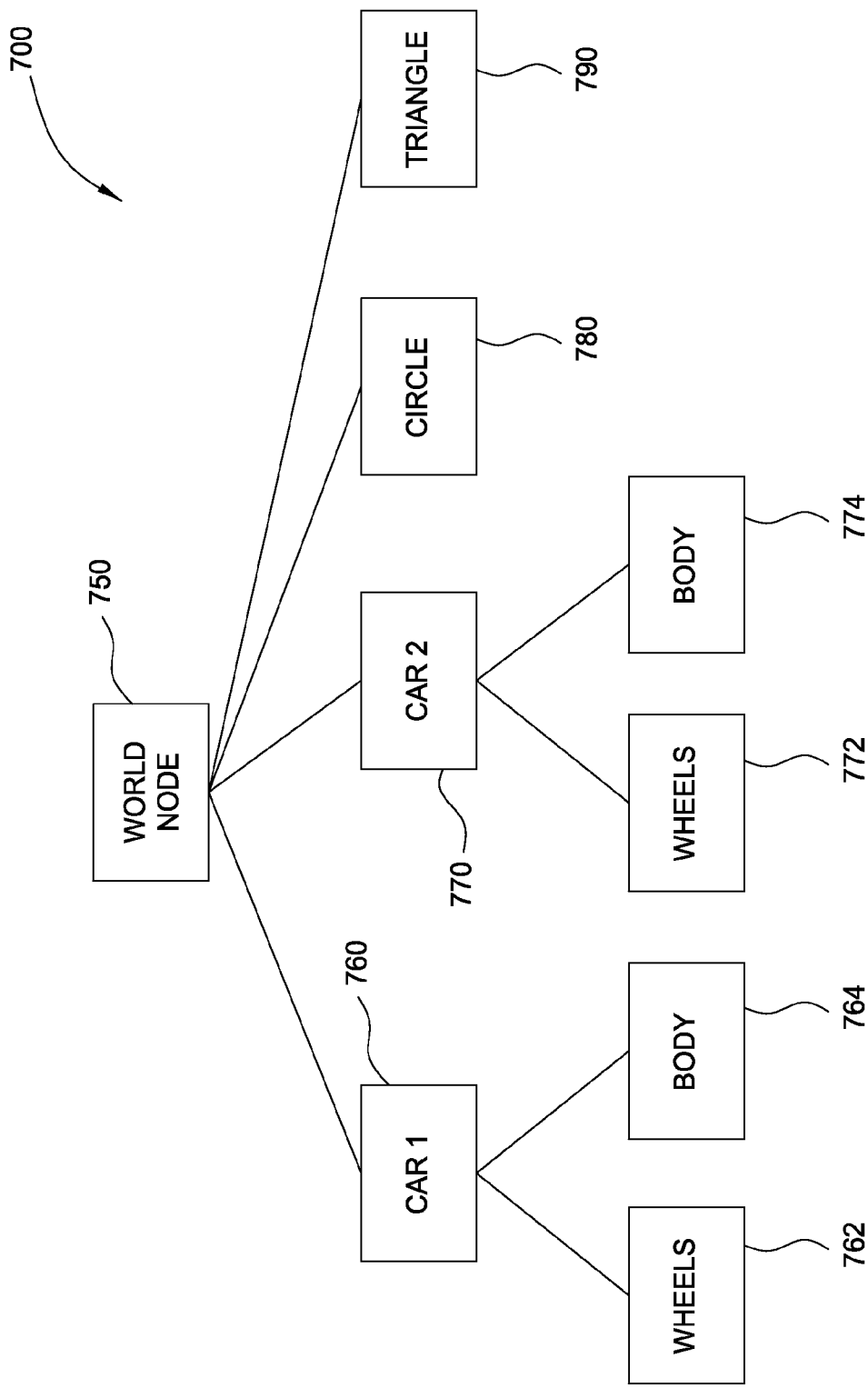
FIG. 7 illustrates a scene graph, according to one embodiment of the invention.

For example, FIG. 7 illustrates an exemplary scene graph 700, according to one embodiment of the invention. As illustrated, the scene graph 700 may contain a world node 750 which represents the entire three-dimensional scene 605. The world node 750 may branch to nodes which represent objects within the three-dimensional scene. For example, the world node 750 may branch to four object nodes. Each of the four object nodes in the scene graph 700 may correspond to one of the four objects within the three-dimensional scene 605 of FIG. 6 (i.e., a node 760 corresponding to the first car object $610_1$, a node 770 corresponding to the second car object $610_2$, a node 780 corresponding to the circle object 615, and a node 790 corresponding to the triangle object 620).

The object nodes may branch to other nodes on a lower level of the scene graph 700. The branched to nodes may represent objects which make up part of the larger object or may be nodes which define the object (position, color, mass, etc.). For example, the node 760 representing the first car object branches to a node 762 representing a wheels object and to a node 764 representing a body object. Thus, the scene graph is a hierarchical acceleration data structure based on objects located within a three-dimensional scene.

The scene graph may be stored, for example, in a memory cache (e.g., cache 110) of a processing element to enable the physics engine 505 fast access to the information contained within the scene graph 700. Because a scene graph 700 is an object oriented structure and a physics engine performs calculations on an object by object basis, a scene graph is an efficient structure to use with a physics engine.

In contrast to a physics engine using a scene graph, an image processing system may use a spatial index (e.g., a kd-tree) to render a two-dimensional image from a three-dimensional scene. As described previously with respect to FIG. 4, a spatial index partitions a three-dimensional scene based on a spatial or bounding volume hierarchy. Because a scene graph is a spatial based structure and a ray tracing image processing system performs calculations based on where a ray traverses through a three-dimensional scene, a spatial index is an efficient structure to use with a ray tracing image processing system.

Figure 8:
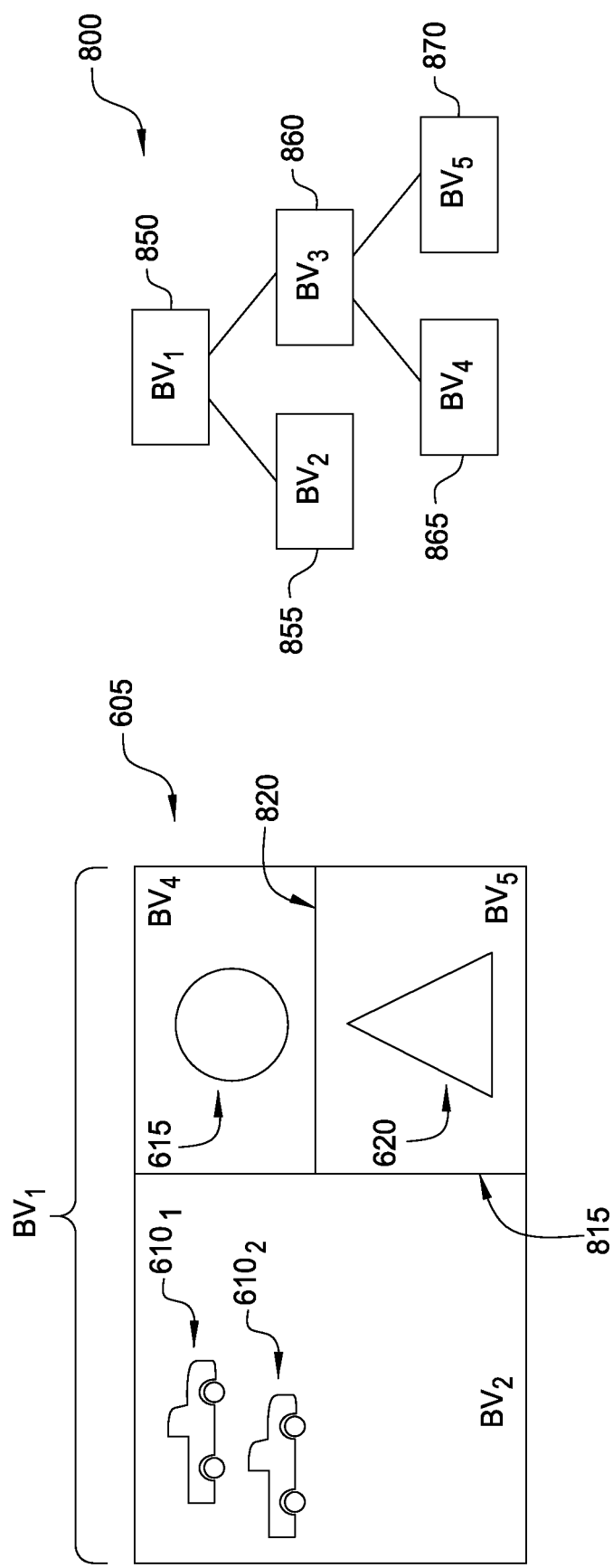
FIG. 8 illustrates a three-dimensional scene to be rendered by an image processing system and a corresponding spatial index, according to one embodiment of the invention.

FIG. 8 illustrates a spatial index 800 which may be used by an image processing system to render a two-dimensional image from the three-dimensional scene 605. The three-dimensional scene 605 illustrated in FIG. 7 may be the same three-dimensional scene 605 to which the scene graph 700 corresponds.

The spatial index 800 may contain a world node 850 which defines bounding volume 1 ($BV_1$) which encompasses the entire volume of the three-dimensional scene 605. $BV_1$ may be partitioned into two smaller bounding volumes $BV_2$ and $BV_3$ through the use of a splitting plane 815. The partitioning of $BV_1$ is reflected in the kd-Tree as the two nodes 855 and 860, corresponding to $BV_2$ and $BV_3$ respectively, under the internal or parent node $BV_1$ 850. The internal node 850 representing $BV_1$ may now store information such as, but not limited to, pointers to the two nodes beneath $BV_1$ (e.g., $BV_2$ and $BV_3$), along which axis the splitting plane 815 was drawn (e.g., x-axis), and where along the axis the splitting plane 815 was drawn.

Furthermore, $BV_3$ may be partitioned into two smaller bounding volumes $BV_4$ and $BV_5$. Two leaf nodes 865 and 870 in the spatial index may correspond to the bounding volumes $BV_4$ and $BV_5$, respectively.

The leaf nodes (i.e., 855, 865, and 870) of the spatial index 800 may include information which defines the corresponding bounding volumes within the three-dimensional scene (i.e., $BV_2$, $BV_4$ and $BV_5$) and may contain pointers to primitives located within the corresponding bounding volumes.

On a frame to frame basis, objects within the three-dimensional scene may move or change shape. In response to changes in position or shape of objects, the spatial index may need to be updated such that the spatial index accurately reflects the location of objects or primitives within the three-dimensional scene. Similarly, a scene graph used by the physics engine 505 may also need to be updated to accurately reflect the new position or shape of objects within the three-dimensional scene. Thus, in response to objects moving or changing shape, two data structures may need to be updated on a frame to frame basis.

The image processing system may store the spatial index 800, for example, in the memory cache (e.g., cache 110). As previously described, a scene graph may also be stored in the memory cache 110 of the multiple core processing element 100. However, in some circumstances the memory cache 110 may not have enough storage space available to efficiently store both the scene graph 700 and the spatial index 800.

Integrated Acceleration Data Structure for Physics and Ray Tracing Image Processing According to embodiments of the invention, an integrated acceleration data structure may be used by both the physics engine 505 and the image processing system in order to perform both physics calculations and to perform ray tracing respectively. A single integrated acceleration data structure may perform the functions of a spatial index and may simultaneously perform the functions of a scene graph. By using a single integrated acceleration data structure rather than using two data structures, the amount of space required to store information sufficient for both the physics engine 505 and the image processing system to perform their respective tasks may be reduced. Furthermore, in contrast to the need to update two data structures in response to movements of objects within the three-dimensional scene, the image processing system may only need to update a single data structure (i.e., the integrated acceleration data structure). The processing time gained by only updating a single data structure may reduce the time necessary to perform physics engine tasks and image processing tasks, thus increasing overall system performance.

According to one embodiment of the invention, an integrated spatial index may be formed by initially partitioning a three-dimensional scene into bounding volumes that encompass objects within the three-dimensional scene. Accordingly, the initial or top portions of the integrated acceleration data structure are formed based on a spatial or bounding volume hierarchy. Once a bounding volume encompasses an object within the three-dimensional scene, an object oriented hierarchy may be used to represent the object within the bounding volume. Thus, the lower portions of the integrated acceleration data structure are formed based on an object oriented hierarchy. Consequently, the initial or top portions of the integrated acceleration data structure may resemble a spatial index 800 (e.g., a kd-tree) and the lower portions of the integrated acceleration data structure may resemble a scene graph 700.

Figure 9:
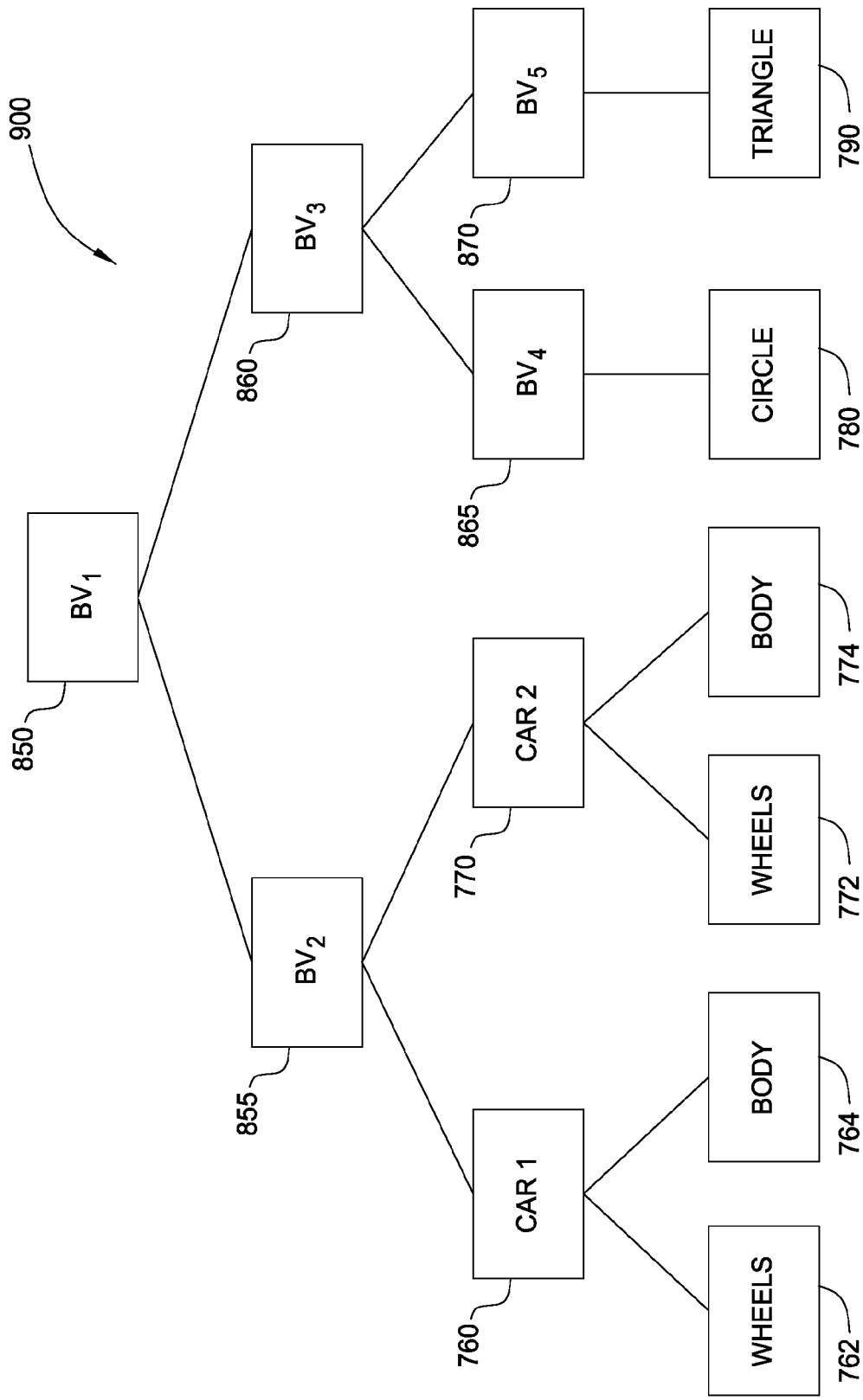
FIGS. 9 and 11 illustrate integrated acceleration data structures, according to embodiments of the invention.

FIG. 9 illustrates an integrated acceleration data structure 900, according to one embodiment of the invention. The exemplary integrated acceleration data structure 900 corresponds to the three-dimensional scene 605 illustrated in FIG. 6.

The integrated acceleration data structure 900 illustrated in FIG. 9 has an initial structure defined by the spatial index 800 which was described with reference to FIG. 8, having a world node and smaller bounding volumes.

According to embodiments of the invention, in order to form an integrated acceleration data structure 900, the nodes which define bounding volumes within the three-dimensional scene may branch to (i.e., contain information which points to) nodes which define objects located within bounding volumes. Thus, in contrast to a spatial index where the final spatially oriented nodes (i.e., the leaf nodes) only point to primitives, the final spatially oriented nodes in an integrated acceleration data structure 900 may branch to object nodes which define objects.

For example, as illustrated in FIG. 9, node 855 corresponding to $BV_2$ may branch to object nodes 760 and 770 (representing the first car object $610_1$ and the second car object $610_2$) from the scene graph 700. The object nodes 760 and 770 are branched to from the node 855 corresponding to $BV_2$ because the first car object $610_1$ and the second car object $610_2$ are both located within bounding volume $BV_2$ as illustrated in FIG. 8.

Similar to the scene graph 700, the nodes branched to from each object node in the integrated acceleration data structure 900 may continue to define properties of the objects or portions of the object which collectively construct the object. For example, each car object node branches to a wheel object node (e.g., 762 or 772) and a body object node (e.g., 764 or 774), which further define each car object.

Also illustrated in the integrated acceleration data structure 900 are nodes corresponding to the remaining objects in the three-dimensional scene 605. For example, the circle object node 780 is branched to from the node 865 defining the bounding volume $BV_4$. The circle object node 780 may be branched to from the node 865 defining bounding volume $BV_4$, because the circle object 615 is located within bounding volume $BV_4$. Furthermore, the triangle object node 790 is branched to from the node 870 defining the bounding volume $BV_5$. The triangle object node 790 may be branched to from the node 865 defining bounding volume $BV_5$, because the triangle object 620 is located within bounding volume $BV_5$.

In order for a physics engine 505 or an image processing system to determine if a node corresponds to an object or to a bounding volume, each node within the integrated acceleration data structure may contain an object node flag or bit. The object node bit may be a single bit located within the memory space which defines a node within the integrated acceleration data structure 900. According to one embodiment of the invention, if a node within the spatial index is an object node, the object node bit may be asserted. Furthermore, if a node within the spatial index is not an object node, the object node bit may not be asserted. Thus, a physics engine 505 performing physics calculations or the image processing system performing ray tracing may be able to quickly determine if the node is an object node or a node defining a bounding volume by determining if the object node bit is asserted.

Integrated Acceleration Data Structure Usage

According to embodiments of the invention, an image processing system may perform ray tracing with an integrated acceleration data structure. As described with regards to FIG. 4, when using a spatial index (e.g., a kd-tree) the image processing system may use a workload manager 205 to issue rays into the three-dimensional scene and to trace the rays (based on the trajectory of the ray) through the three-dimensional scene. The workload manager 205 may trace rays through the three-dimensional scene using the spatial index by performing ray-bounding volume intersection tests against the bounding volumes defined by the nodes in the spatial index. The workload manager 205 may take branches to nodes based on which bounding volumes are intersected by the ray. When the workload manager 205 traverses to a certain point within the spatial index (e.g., a leaf node defining a bounding volume), the workload manager 205 may send the ray to a vector throughput engine 210 to determine if the ray intersects any primitives (e.g., contained within the bounding volume defined by the leaf node). If the ray intersects a primitive, the vector throughput engine 210 may consequently determine the color contribution to the two-dimensional image based on an intersected primitive. If not, the workload manager 205 may traverse the kd-tree again to determine if the ray intersects any other primitives located within the three-dimensional scene.

The image processing system may use an integrated acceleration data structure 900 to perform ray tracing, in a manner similar to using a spatial index. The image processing system may issue rays into the three-dimensional scene and trace rays through the three-dimensional scene using the integrated acceleration data structure 900 by performing ray-bounding volume intersection tests against the bounding volumes defined by the spatially oriented nodes in the spatial index. The workload manager 205 may take branches to nodes based on which bounding volumes are intersected by the ray. When the workload manager 205 traverses to a certain point within the integrated acceleration data structure (e.g., an object node), the workload manager 205 may send the ray to a vector throughput engine 210 to determine if the ray intersects any primitives. However, according to other embodiments of the invention, the workload manager 205 may determine if the ray intersects any primitives.

Furthermore, the physics engine 505 may perform physics related tasks using the integrated acceleration data structure. When using a scene graph the physics engine may determine the effect of physical phenomena on objects within the three-dimensional scene 605 on an object-by-object basis. The physics engine 505 may perform the same physics calculations with an integrated acceleration structure on an object-by-object basis by searching for object nodes within the integrated acceleration data structure 900. The physics engine 505 may determine if a node is an object node by checking the object node bit in the information which defines the node. Once a node is found within the integrated acceleration data structure that has its object node bit asserted, the physics engine may perform physics calculations on the object.

Thus, by forming a data structure which uses both a spatial (or bounding volume) oriented hierarchy and an object oriented hierarchy, a single data structure may be formed which may be used by both the image processing system and the physics engine 505.

Although in the preceding example the integrated acceleration data structure 900 has been described wherein each entire object may be contained within a single bounding volume, in some circumstances portions of objects may be located within two separate bounding volumes. That is, objects within the three-dimensional scene may be divided by a splitting plane which creates a boundary between bounding volumes. Consequently, portions of an object may be located within separate bounding volumes created by the splitting plane.

In this scenario, according to one embodiment of the invention, the information defining an object node may contain a bit location which indicates that information which defines the entire object is located within a plurality of object nodes within the integrated acceleration data structure. The bit within the information defining an object node may be asserted to indicate that information which defines the object may be located within a plurality of object nodes of the integrated acceleration data structure, and de-asserted to indicate that the information which defines the object is located entirely within the current object node.

Furthermore, if an object node which contained only a portion of an object was created when constructing the integrated acceleration data structure, a pointer to another object node (or nodes) which contain the remaining information which defines the object may be stored in each object node (which contains a portion of the object, according to one embodiment of the invention. Thus, the physics engine may quickly find the other object node(s) within the integrated acceleration data structure. By using a bit within the information defining an object node to indicate whether or not the object is defined within a plurality of object nodes, the likelihood may be reduced that a physics engine 505 performing position updates or collision detection tests fails to perform tests against all of the portions of an object located within the three-dimensional scene.

Figure 10:
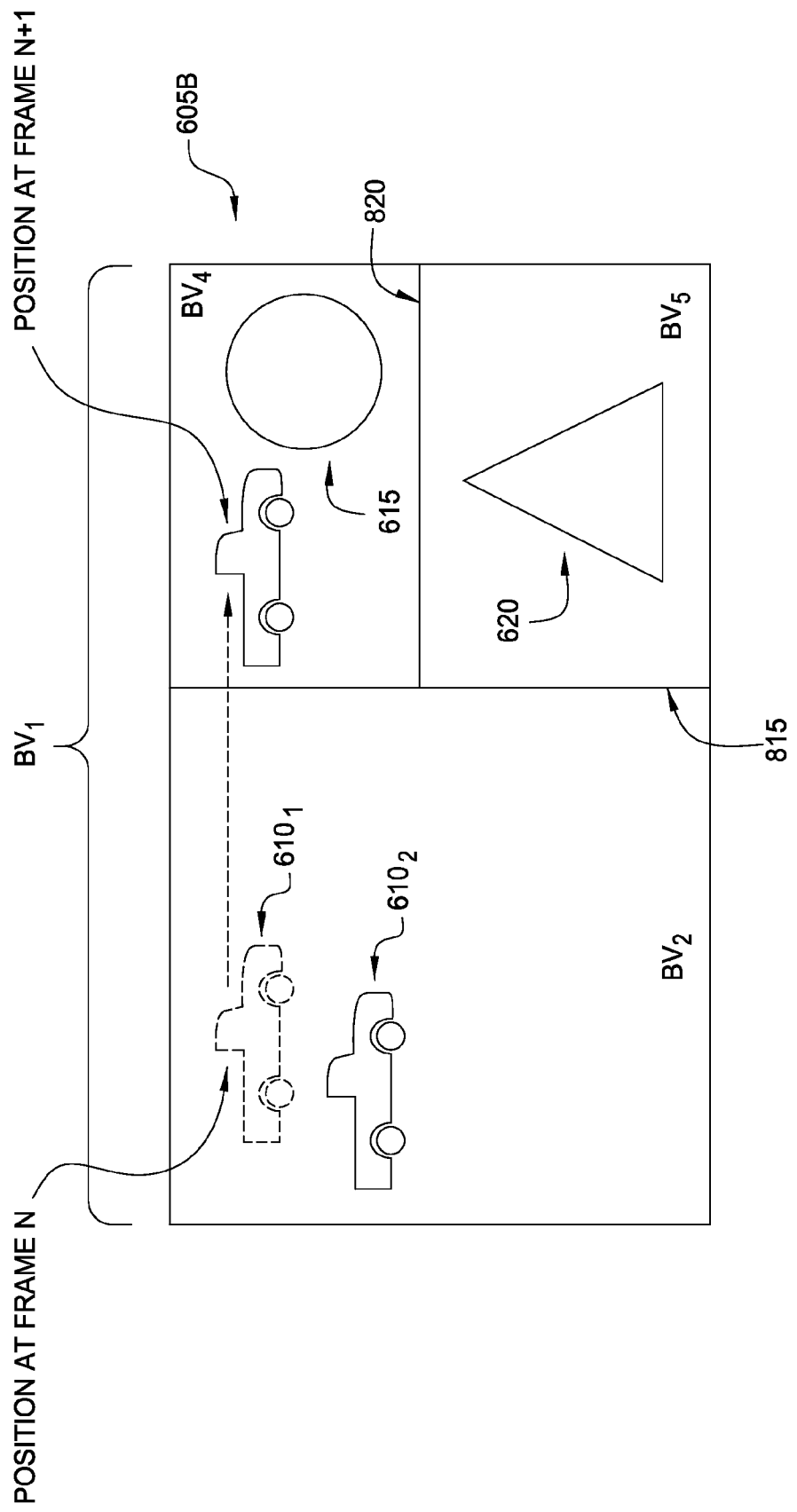
FIG. 10 illustrates a three-dimensional scene to be rendered by an image processing system, according to one embodiment of the invention.

Updating an Integrated Acceleration Data Structure in Response to Object Movements According to embodiments of the invention, an integrated acceleration data structure 900 may be used to maintain a record of movements or changes to objects located within the three-dimensional scene. For example, in contrast to the three-dimensional scene 605 illustrated in FIG. 6, FIG. 10 illustrates a three-dimensional scene 605B where the first car object 610$_1$ has moved from a first position in the frame N of the three-dimensional scene 605 to a second position in frame N+1 of the three-dimensional scene 605 (as illustrated by the dashed lines in FIG. 10).

In response to the movement of the first car object 610$_1$, hardware or software components within the image processing system may update the integrated acceleration data structure 900.

According to one embodiment of the invention, the physics engine 505 may update the integrated acceleration data structure 900 to reflect change in position or shape of objects within the three-dimensional scene 605. The physics engine 505 may perform position updates and collision detection tests for all of the objects located within the three-dimensional scene. For example, the object node 760 corresponding to the first car object 610$_1$ may be updated to reflect the new position of the first car object 610$_1$. After performing the tests, the physics engine 505 may record the results of the calculations (e.g., the new positions of the objects) in the integrated acceleration data structure 900.

Furthermore, if an object has moved such that the branches to nodes within the integrated acceleration data structure need to be updated, the physics engine 505 may update the branches as well. For example, the movement of the first car object 610$_1$ from its position illustrated in frame N of the three-dimensional scene 605 (as seen in FIG. 7) to its position illustrated in frame N+1 of the three-dimensional scene (as seen in FIG. 10) may require that the physics engine 505 update the position of the first car object 610$_1$ in the integrated acceleration data structure 900. Furthermore, as illustrated in FIG. 10 the first car object has moved to such a degree that it is no longer located within the bounding volume BV$_2$, rather the first car object 610$_1$ has moved such that it is located within the bounding volume BV$_4$. Thus, the physics engine 505 may update the integrated acceleration data structure 900 so that the node 865 corresponding to BV$_4$ branches to the object node 760 corresponding to the first car object 610$_1$.

Figure 11:
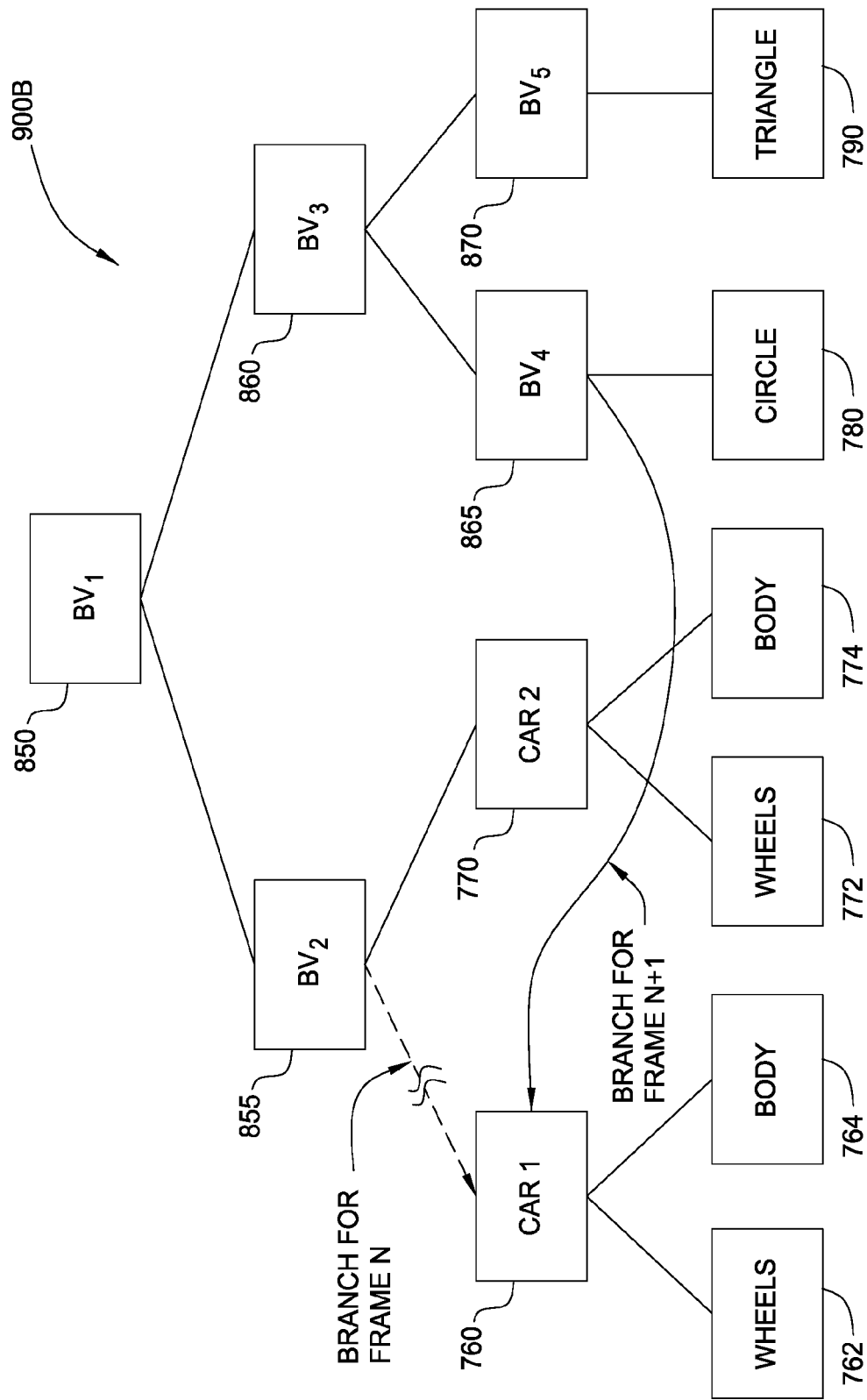

For example, FIG. 11 illustrates an updated integrated acceleration data structure 900B which reflects the new position of the first car object 610$_1$. The branch from the node 855 corresponding to BV$_2$ to the object node 760 corresponding to the first car object 610$_1$ may have been removed or deleted by the physics engine 505 to reflect the movement of the first car object 610$_1$ out of the bounding volume BV$_2$. Furthermore, a new branch from the spatial index node 865 corresponding to BV$_4$ to the object node 760 corresponding to the first car object 610$_1$ may have been added by the physics engine 505 to reflect the movement of the first car object 610$_1$ into the bounding volume BV$_4$. Thus, the new position of the first car object 610$_1$ in the three-dimensional scene 605 is now reflected in the updated integrated acceleration data structure 900B.

As illustrated in FIG. 11, the remaining nodes and branches in the updated integrated acceleration data structure 900B are the same as in the integrated acceleration data structure 900 because (in this simple example) no other objects moved from frame N to frame N+1. The image processing system may now use the updated integrated acceleration data structure 900B to render a two-dimensional image from the three-dimensional scene 605, and the physics engine 505 may use the updated integrated acceleration data structure 900B to perform physics related calculations.

Cooperative Utilization of Spatial Indices Between Application and Rendering Hardware In general, an image processing system may include various software applications and rendering hardware, also known as a rendering engine, which may be designed to traverse and interpret contents of a data structure, which keeps track of objects in a three-dimensional scene, to render a two-dimensional image from a three-dimensional scene.

One such structure that a rendering engine may use is a scene graph or a scene index, as described above with reference to FIG. 7. The rendering engine may use a scene graph to store and access information which defines the objects located within the three-dimensional scene on a frame to frame basis. The scene graph may use a hierarchical structure (e.g., a tree with a plurality of nodes) to index or order the objects. Each node of the tree may either represent an object which makes up part of the larger object or may be a node which defines the object's attributes such as color, texture, light sources, etc.

Additionally, an image processing system using a ray tracing methodology may also use a ray tracing unit to perform all the ray tracing operations. As stated earlier, such a system may require a spatial index, such as a kd-tree, to efficiently perform the operations. A system using a spatial index for the ray tracing unit and a scene graph for the rendering engine can be costly in terms of storage. Therefore, according to another embodiment of the invention, an image processing system containing both a rendering engine and a ray tracing unit may be designed to use a single integrated acceleration data structure to reduce the overhead of having both a spatial index and a scene graph.

For example, the rendering engine and the ray tracing unit can use a similar integrated acceleration data structure as described above in reference to FIG. 9. In the event the rendering engine decides to render an image, it may traverse the integrated acceleration structure by searching for object nodes within the integrated acceleration data structure. Similar to the physics engine, the rendering engine may determine if a node is an object node by checking an object node bit in the information which defines the node. Once a node is found within the integrated acceleration data structure that has its object node bit asserted, the rendering engine may draw the image based on the information associated with that object.

For one embodiment of the invention, as illustrated in FIG. 12, multiple applications can utilize the same integrated acceleration data structure 1202 in a system. For example, in one embodiment, a ray tracing unit 1204, a rendering engine 1206, and other applications 1210 (artificial intelligence engines, audio engines, etc) may all utilize an integrated acceleration data structure 1202. The option to use multiple applications can be accomplished so long as the object nodes 1214 of the integrated acceleration data structure 1202 support attributes 1212 that can be utilized by all the different applications. For example, the color and texture-defining attributes 1214, 1216 can be utilized by a ray tracing unit and a rendering engine. The sound-defining attributes 1220 can be utilized by another application, for example an audio engine.

Figure 12A:
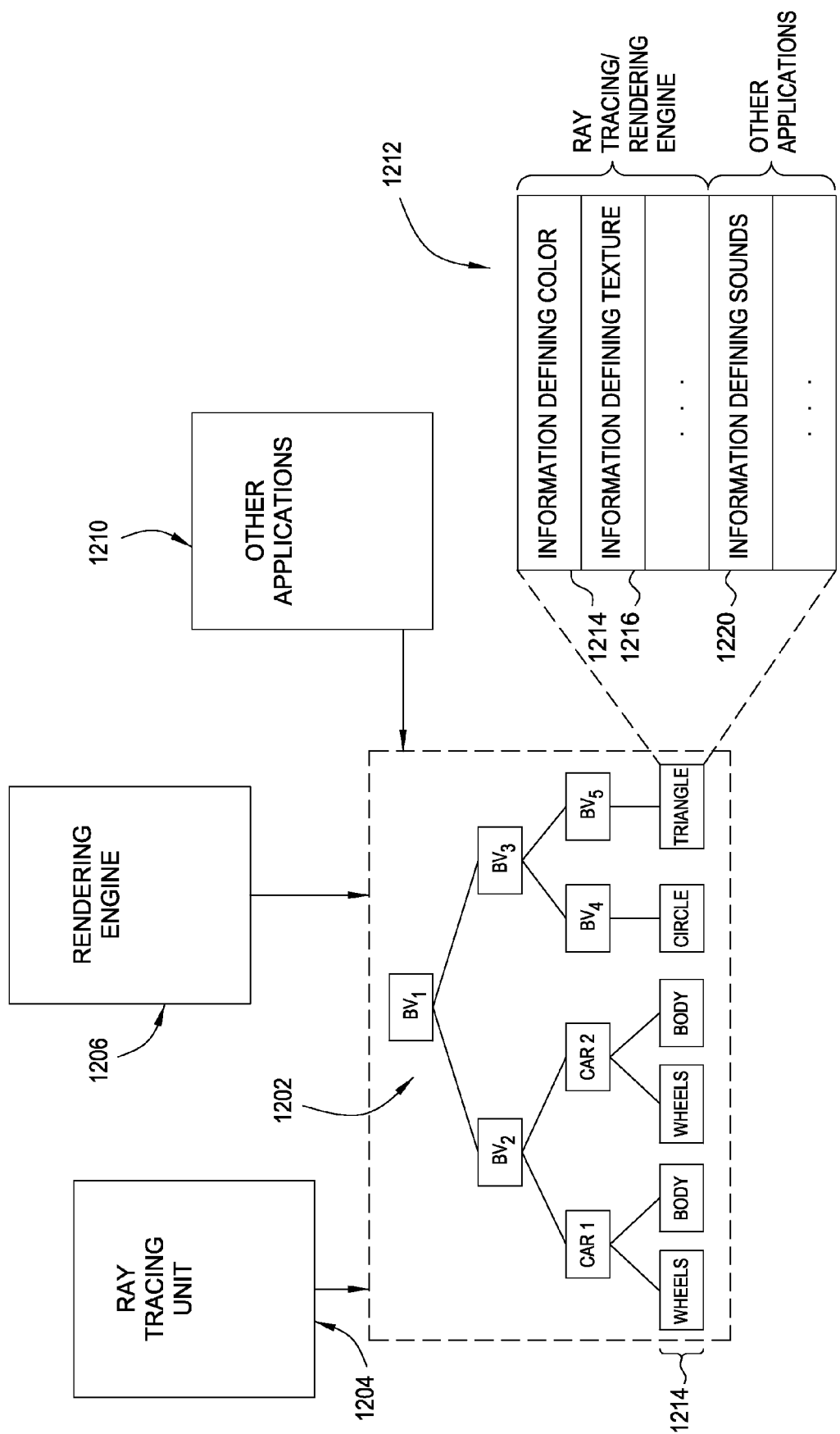
FIG. 12A illustrates a system where multiple applications are accessing a single integrated acceleration data structure, according to one embodiment of the invention.
Figure 12B:
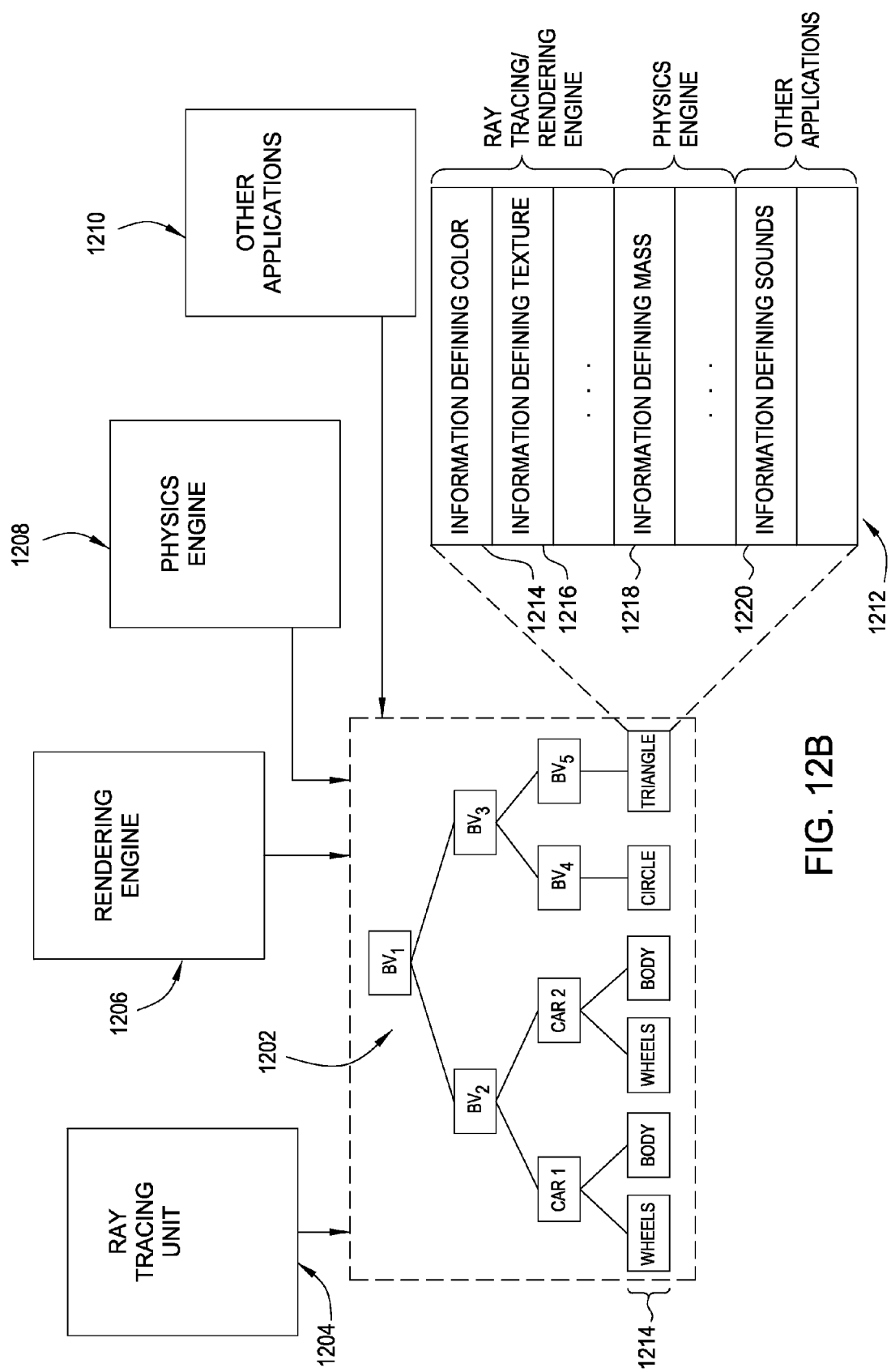
FIG. 12B illustrates a system where multiple applications are accessing a single integrated acceleration data structure, according to another embodiment of the invention.

For another embodiment of the invention, as illustrated in FIG. 12B, a physics engine can utilize the same integrated acceleration data structure 1202 along with the other engines and applications illustrated in FIG. 12A. Here, additional support for the physics engine can be added by including physics-related attributes such as a mass-defining attribute 1218.

Conclusion

According to embodiments of the invention, by creating a data structure having an initial or upper portion representing bounding volumes which partition a three-dimensional scene and having a second or lower portion representing objects within the three-dimensional scene, an integrated acceleration data structure may be formed. The integrated acceleration data structure may be used by a rendering engine to render a two-dimensional image from a three-dimensional scene, and by a ray tracing unit to perform intersection tests. Thus, in contrast to a need for a separate data structure for each of the ray tracing unit and the rendering engine, only a single integrated acceleration data structure is needed.

While the foregoing is directed to embodiments of the present invention, other and further embodiments of the invention may be devised without departing from the basic scope thereof, and the scope thereof is determined by the claims that follow.

What is claimed is:

1. A method of using an integrated acceleration data structure, comprising:
with a first processing element:
issuing a ray into a three-dimensional scene, and
traversing the integrated acceleration data structure, by one or more computer processors, by taking branches to bounding volume nodes intersected by the ray until an object node is reached, wherein the bounding volume nodes define volumes of the three-dimensional scene; and
with a second processing element, rendering objects by searching the integrated acceleration data structure for object nodes containing attributes of the objects, wherein the attributes are stored within the integrated acceleration data structure.

2. The method of claim 1, wherein at least one bounding volume node defines a bounding volume which encompasses a first object, and wherein the at least one bounding volume node has a branch to the object node which contains information defining the first object.

3. The method of claim 1, wherein object nodes within the integrated acceleration data structure are identified by an object node flag.

4. The method of claim 3, wherein the object node flag is a bit, wherein the bit is asserted for object nodes and unasserted for bounding volume nodes.

5. The method of claim 1, wherein the first processing element is on a first processing core and wherein the second processing element is on a second processing core.

6. The method of claim 1, wherein the second processing element is associated with a physics engine that performs physics related tasks using the attributes fetched from the object nodes of the integrated acceleration data structure.

7. A computer readable non-transitory medium containing a program which, when executed, performs an operation, comprising:
with a first processing element:
issuing a ray into a three-dimensional scene, and
traversing an integrated acceleration data structure by taking branches to bounding volume nodes intersected by the ray until an object node is reached, wherein the bounding volume nodes define volumes of the three-dimensional scene; and
with a second processing element, rendering objects by searching the integrated acceleration data structure for object nodes containing attributes of the objects, wherein the attributes are stored within the integrated acceleration data structure.

8. The computer readable non-transitory medium of claim 7, wherein at least one bounding volume node defines a bounding volume which encompasses a first object, and wherein the at least one bounding volume node has a branch to the object node which contains information defining the first object.

9. The computer readable non-transitory medium of claim 7, wherein object nodes within the integrated acceleration data structure are identified by an object node flag.

10. The computer readable non-transitory medium of claim 9, wherein the object node flag is a bit, wherein the bit is asserted for object nodes and unasserted for bounding volume nodes.

11. The computer readable non-transitory medium of claim 7, wherein the second processing element is associated with a physics engine that performs physics related tasks using the attributes fetched from the object nodes of the integrated acceleration data structure.

12. A system, comprising:
an integrated acceleration data structure, wherein the integrated acceleration data structure comprises bounding volume nodes which define bounding volumes of a three-dimensional scene and object nodes which define objects located within the three-dimensional scene;
a first processing element configured to:
issue a ray into the three-dimensional scene, and
traverse the integrated acceleration data structure by taking branches to bounding volume nodes intersected by the ray; and a second processing element configured to render objects by searching the integrated acceleration data structure for object nodes containing attributes of the objects, wherein the attributes are stored within the integrated acceleration data structure, wherein the second processing element comprises hardware elements.

13. The system of claim 12,
wherein at least one bounding volume node defines a bounding volume which encompasses a first object, and wherein the at least one bounding volume node has a branch to the object node which contains information defining the first object.

14. The system of claim 12, wherein object nodes within the integrated acceleration data structure are identified by an object node flag.

15. The system of claim 14, wherein the object node flag is a bit, wherein the bit is asserted for object nodes and unasserted for bounding volume nodes.

16. The system of claim 12, further comprising
a first processing core; and
a second processing core, wherein the first processing element is located on the first processing core and the second processing element is located on the second processing core.

17. The system of claim 12, further comprising
a third processing element; configured to perform physics based calculations on objects within the three-dimensional scene by searching for object nodes within the integrated acceleration data structure, and perform the physics based calculations on objects defined by the object nodes.

18. The system of claim 12, wherein the second processing element is associated with a physics engine that performs physics related tasks using the attributes fetched from the object nodes of the integrated acceleration data structure.

\* \* \* \* \*